(12) United States Patent
Braun et al.

(10) Patent No.: US 7,256,520 B2
(45) Date of Patent: Aug. 14, 2007

(54) POWER TOOL WITH A SELF-SUPPORTING MOTOR

(75) Inventors: Sigmund Braun, Kusterdingen (DE); Boris Rudolf, Stuttgart (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 11/108,477

(22) Filed: Apr. 18, 2005

(65) Prior Publication Data

US 2005/0225183 A1 Oct. 13, 2005

Related U.S. Application Data

(63) Continuation of application No. PCT/EP2003/011097, filed on Oct. 8, 2003.

(30) Foreign Application Priority Data

Oct. 17, 2002 (DE) ................................ 102 48 921

(51) Int. Cl.
 *H02K 7/14* (2006.01)
 *H02K 9/06* (2006.01)
 *H02K 5/00* (2006.01)

(52) U.S. Cl. ..................... 310/50; 310/89; 310/62; 310/217

(58) Field of Classification Search .................. 310/50, 310/128, 129, 89, 62, 63, 217
See application file for complete search history.

(56) References Cited

U.S. PATENT DOCUMENTS

| 828,945 A * | 8/1906 | Maclean .................... 173/145 |
| 2,987,636 A | 6/1961 | Jepson ......................... 310/50 |
| 3,476,960 A * | 11/1969 | Rees ............................ 310/50 |
| 3,585,331 A * | 6/1971 | Bednarski et al. ....... 200/43.01 |
| 6,277,013 B1 * | 8/2001 | Sasaki et al. ............... 451/360 |
| 6,543,549 B1 * | 4/2003 | Riedl et al. .................. 173/216 |
| 6,555,773 B1 * | 4/2003 | Broghammer et al. ... 200/61.85 |
| 6,625,892 B2 * | 9/2003 | Takahashi et al. ............ 30/393 |
| 6,892,459 B2 * | 5/2005 | Okumura et al. ......... 30/123.3 |
| 2002/0170185 A1 * | 11/2002 | Kondo et al. ................. 30/392 |
| 2003/0034164 A1 * | 2/2003 | Rudolf et al. ................... 173/2 |
| 2003/0190877 A1 * | 10/2003 | Gallagher et al. .......... 451/344 |

FOREIGN PATENT DOCUMENTS

DE 839 064 5/1952

(Continued)

OTHER PUBLICATIONS

International Search Report dated Mar. 5, 2004.
German Search Report; Jan. 10, 2006; 4 pages.

*Primary Examiner*—Burton S. Mullins
*Assistant Examiner*—Erik Preston
(74) *Attorney, Agent, or Firm*—St. Onge Steward Johnston & Reens LLC

(57) ABSTRACT

A power tool comprising an electric motor for driving a tool is disclosed. The electric motor comprises a shaft, an armature, and a brush collector. The stator is configured as a self-supporting unit comprising first and second supporting parts. One of the supporting parts may be configured as an air guide ring allowing air to be routed between a fan and the opposite end of the electric motor along the armature and the brushes.

19 Claims, 6 Drawing Sheets

FOREIGN PATENT DOCUMENTS

| | | |
|---|---|---|
| DE | 884 163 | 7/1953 |
| DE | 940 477 | 3/1956 |
| DE | 1 047 298 | 6/1959 |
| DE | 8908646 | 11/1989 |
| DE | 4019894 A1 | 4/1991 |
| DE | 40 27 135 | 3/1992 |
| DE | 43 09 049 | 9/1994 |
| FR | 1.136.606 | 5/1957 |
| JP | 2002270066 A * | 9/2002 |
| WO | WO 01/51251 A1 | 7/2001 |

* cited by examiner

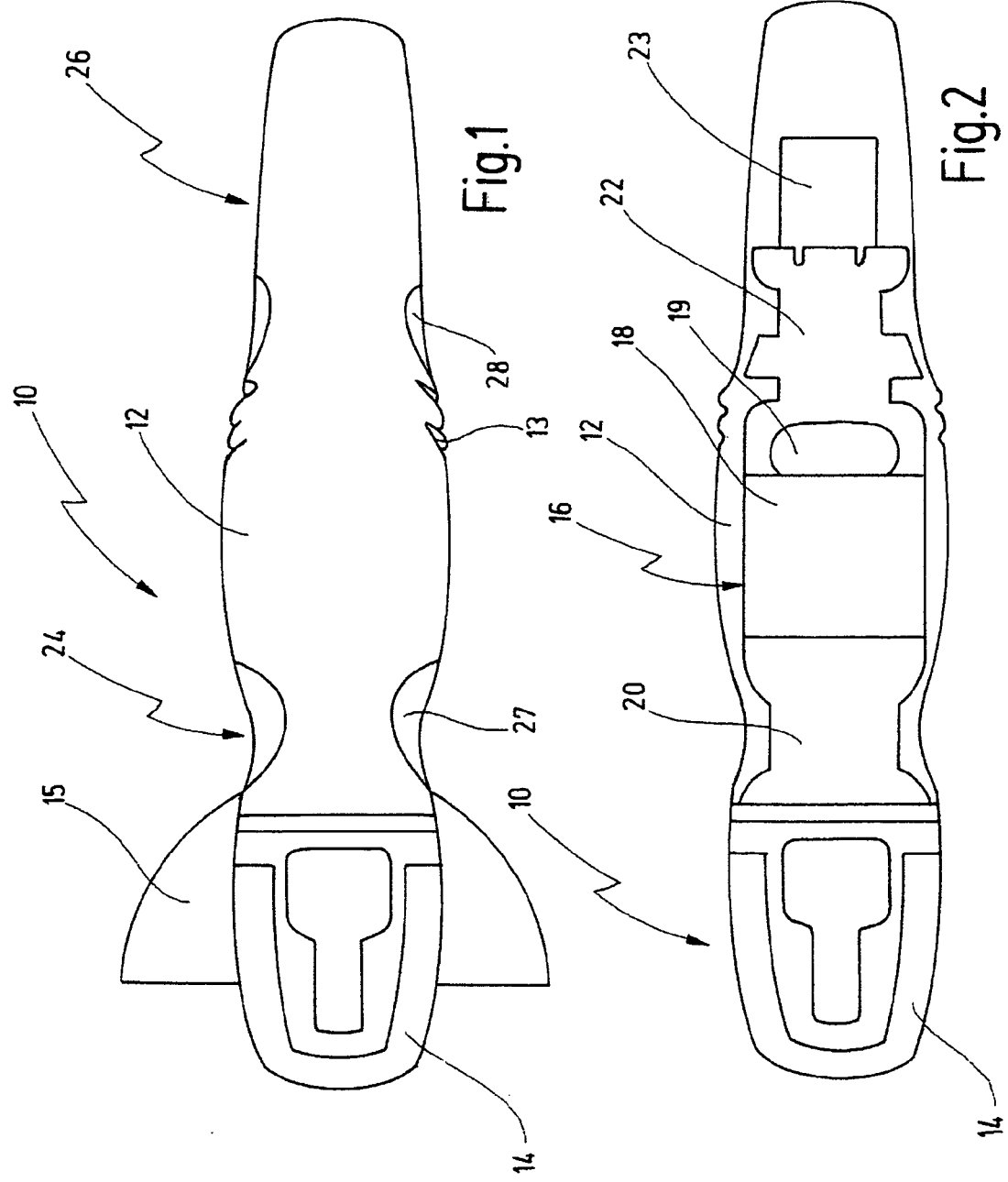

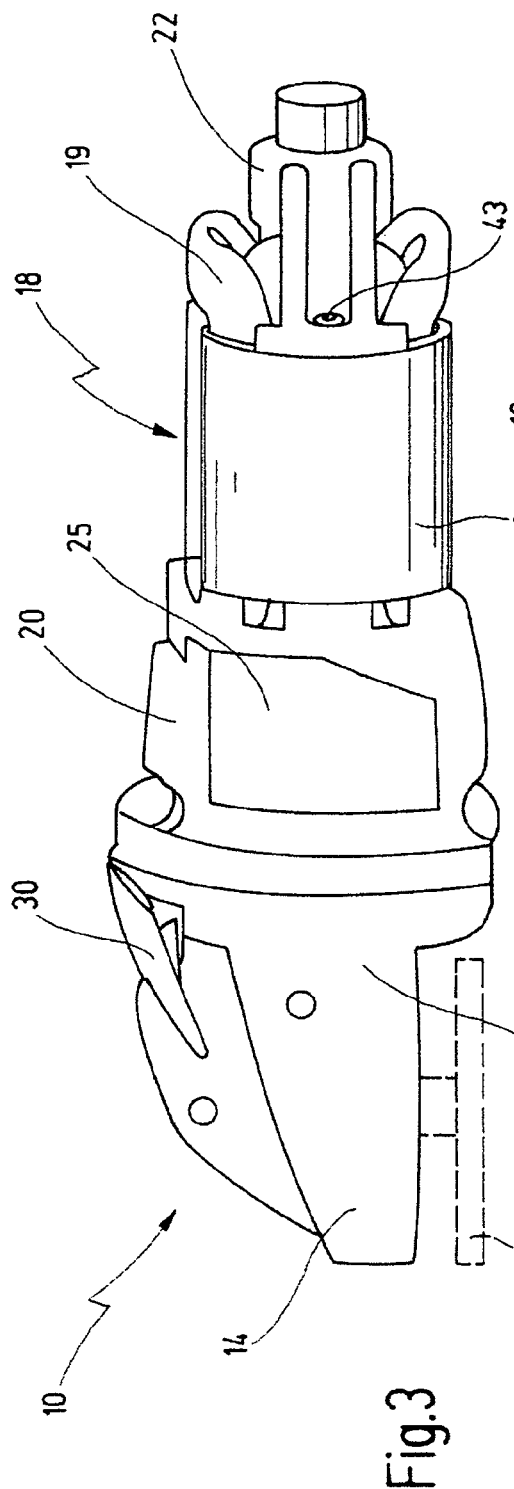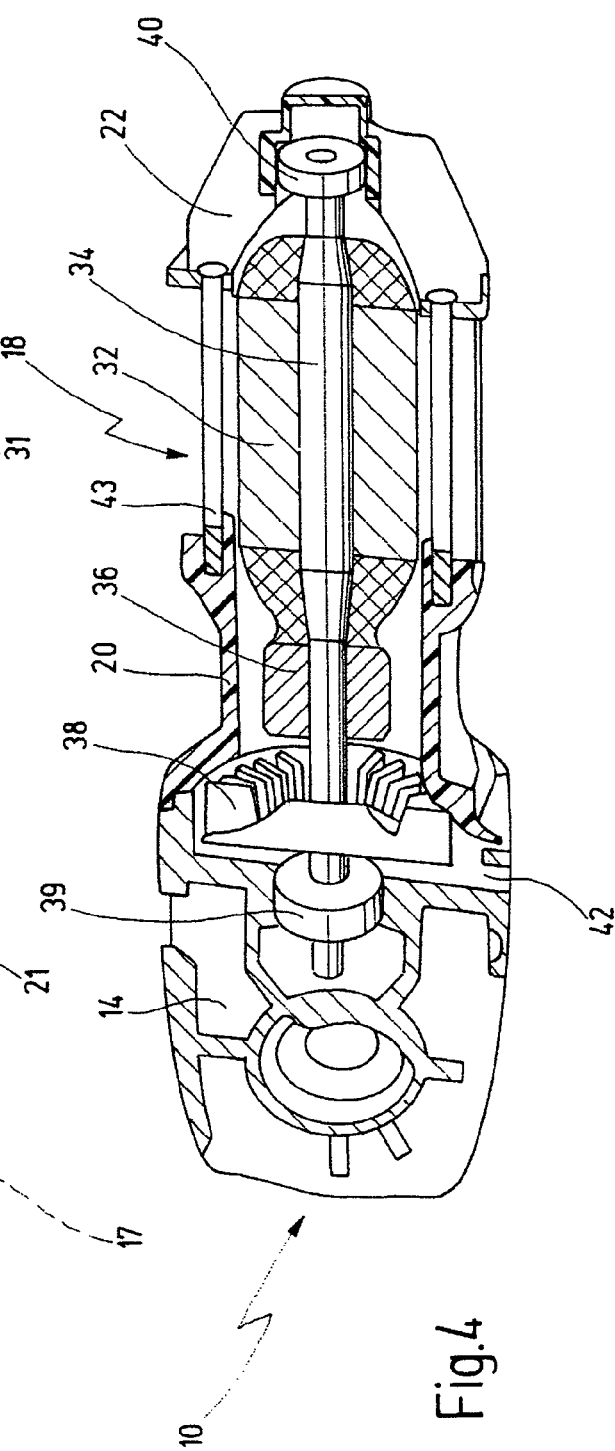
Fig.3
Fig.4

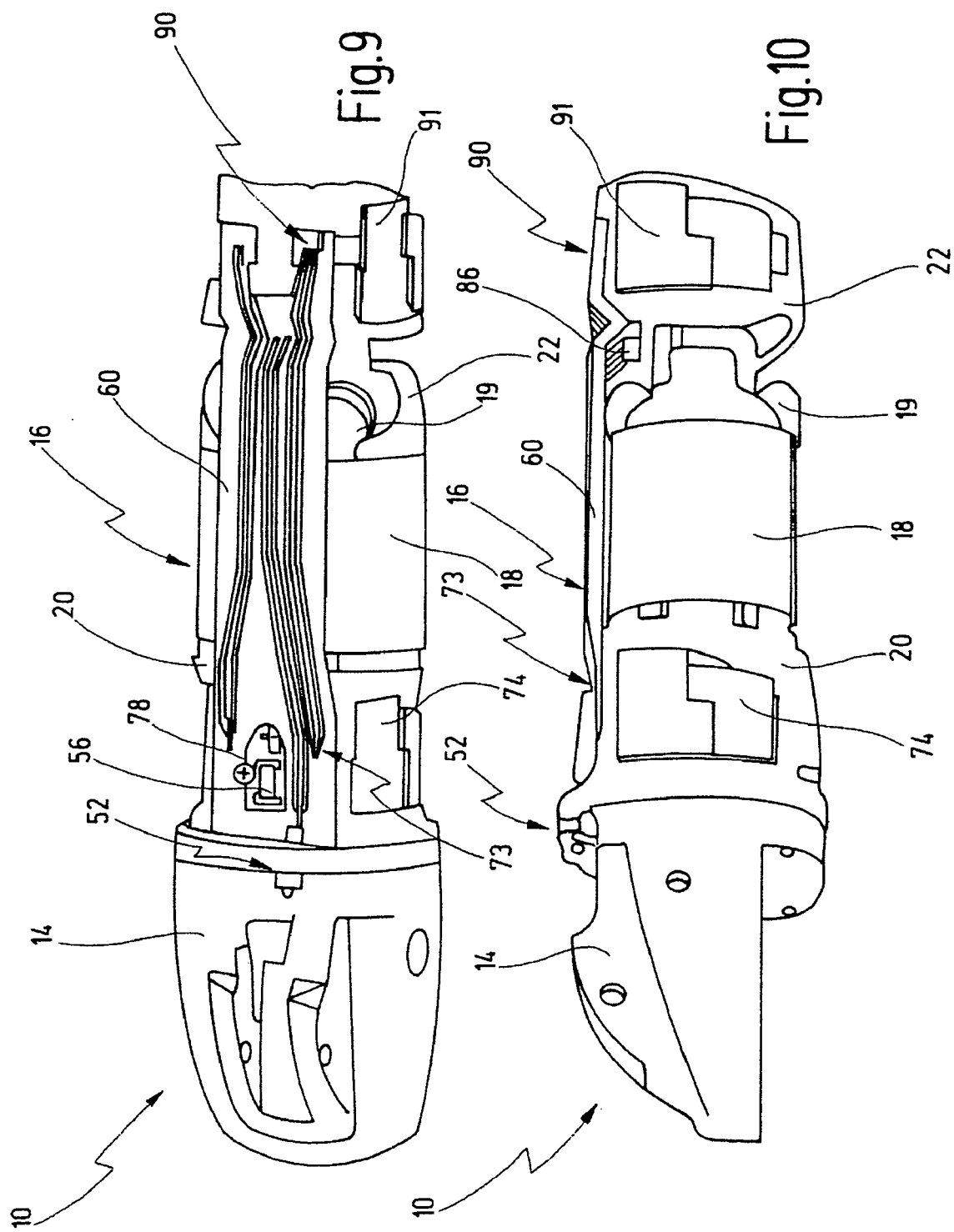

POWER TOOL WITH A SELF-SUPPORTING MOTOR

RELATED APPLICATIONS

This application is a continuation application of International Patent Application PCT/EP2003/011097 filed Oct. 8, 2003 and claiming priority of German patent application DE 10248921.2 filed Oct. 17, 2002 which is fully incorporated by reference herewith.

BACKGROUND OF THE INVENTION

The invention relates to an power tool having an electric motor for driving a tool, having a motor shaft, having a stator, having an armature and having a commutator with brushes.

An power tool such as this is known, for example from WO 01/51251 A1 which corresponds to U.S. Ser. No. 2002/0151262 A2. The known power tool is an angle grinder with a universal motor which has a fan at its end facing the tool, and has a commutator with brushes at the opposite end. The angle grinder is surrounded by a housing on which the bearing for the motor shaft, a tool head for driving the tool, the brushes, switches and the like are held.

Power tools such as these have been known for many years.

Normally, power tools are driven by universal motors. A universal motor normally has a housing within which a stator with pole field windings is provided, within which an armature is arranged such that it can rotate. The armature is held on a motor shaft, which is mounted by means of bearings on the housing such that it can rotate. Furthermore, a universal motor has a fan which is provided at a first end of the armature, and has a commutator with brushes, which is provided at the other end of the armature.

Owing to the high power/weight ratio and the capability to use them universally with direct current and with alternating current, universal motors such as these have been proven for driving power tools. As before, power tools are subject to the requirement for weight reduction, for an increase in power and for a reduction in the physical size for the same power. Furthermore, rationalization efforts are continuously resulting in the requirements for a design which is as simple and cost-effective as possible and for simple installation. Furthermore, reliability that is as high as possible is desired, even for use in continuous operation.

Power tools having a housing in the form of a rod always have a specific shaft diameter for a specific power class, thus resulting in a specific minimum diameter for a rod housing, owing to the necessity for the commutator and the associated brushes. If it is now intended to increase the power of an power tool such as this, then this at the same time involves the rod housing having a larger diameter, which has a disadvantageous effect on the handling capability, since excessively large diameters can be gripped with the hand only with difficulty.

SUMMARY OF THE INVENTION

It is a first object of the invention to disclose an improved power tool having a particularly ergonomic design.

It is a second object of the invention to disclose an improved power tool having an improved high power/weight ratio.

It is a third object of the invention to disclose a power tool having a high reliability under adverse operating conditions.

These and other objects of the invention are achieved by a power tool having a self-supporting stator to each of whose two ends a supporting part is attached, wherein brushes are attached by means of brush holders to the two supporting parts, and wherein the motor shaft is mounted on the two supporting parts, or on parts which are attached to them.

The object of the invention is achieved completely in this way.

While, in the past, the stator and the other parts of the motor such as brushes, bearings for the motor shaft, switches and the like have been accommodated in the housing, a self-supporting structure is now used which leads to a weight reduction, and thus to an improved power/weight ratio. In this case, all of the further components of the power tool can be attached to the self-supporting stator by means of the two supporting parts. In this context, these components include, for example, a housing for the power tool, one or more switches, as well as control electronics for controlling the electric motor.

The brushes together with the brush holder and at least one switch are preferably held on a first of the supporting parts, while the control electronics and at least one switch are held on a second of the supporting parts.

This allows a particularly space-saving and weight-saving design.

In a further advantageous development of the invention, the two supporting parts are connected to a housing.

In this way, the load-bearing parts of the power tool can be attached to the supporting parts, and the supporting parts may have widely differing functions, while the housing, which must be specially adapted for the purpose of ergonomic handling of the power tool can be attached to the supporting parts. This decouples the load-bearing function of the supporting parts and the external design of the housing from one another, and simplifies assembly.

According to a further development of the invention, a tool head, into which the tool can be inserted, is attached to a first of the two supporting parts.

In contrast, the motor shaft is preferably mounted in bearings on the tool head and on a second supporting part.

If necessary, the tool head may in this case have a gearbox.

These features assist a modular, particularly space-saving, and ergonomic design of the power tool.

According to a further embodiment of the invention, a switch is attached at least to the first supporting part and can be operated via an activation surface which is held on the housing.

In this case, an activation surface is preferably formed both on the first and on the second supporting part, thus making it possible to hold an power tool in the form of a rod using one or two hands. The activation surface itself may in this case be formed either directly on the relevant supporting parts or else on the housing, which extends beyond the relevant supporting part.

According to a further development of the invention, mutually opposite brush holders are held on the first supporting part.

According to a development of this embodiment, the first supporting part has means for electrical connection of the brushes to the stator.

This further simplifies the design. For this purpose, by way of example, a contact can be provided directly on the supporting part, which is otherwise composed of insulating material, allowing contact to be made via a plug connection with the stator. If required, a cable connection may also be provided.

In an additional development of the invention, a grip surface which tapers in the area between the two mutually opposite brush holders is provided on the first supporting part.

The housing may be roughly oval in this area.

This embodiment avoids the disadvantage resulting from the relatively large distance in the area of the two mutually opposite brushes. Instead of having to design the grip surface to be rotationally symmetrical in this area, an approximately oval or elliptical grip surface shape is chosen, so that the larger cross section between the two brushes can be achieved with a narrower cross section in the area in between them. This allows a grip surface with a relatively short grip separation for the fingers even for a relatively high-power power tool.

The two supporting parts are preferably composed of an insulating material, in particular of plastic.

This on the one hand results in a low weight, while on the other hand parts with a complicated shape molded from plastic can be produced using a casting method. Particularly when electrical switches are intended to be held on the supporting parts, an insulated version is particularly advantageous. This makes it possible to achieve the required protection against direct contact for power tools which are operated with mains voltage, in a simpler manner.

Particularly if the power tool is equipped with optical switches, the protection against direct contact can in this case be achieved in a particularly simple manner.

According to a further development of the invention, at least one activation surface for operation of a switching element of a switch is provided at least on one of the two supporting parts.

An embodiment such as this allows a particularly ergonomic design to be achieved, once again in particular when optical switches are used as switches which operate, for example, by means of optical waveguides between which the signal transmission is influenced by means of a monitoring element.

According to a further development of the invention, a fan is held on the motor shaft in the area between the first supporting part and the tool head.

This advantageously allows the fan to be partially integrated in the first supporting part and partially in the tool head in order to achieve a particularly space-saving arrangement.

According to a further alternative of the invention, the object in the case of an power tool of the type mentioned initially is achieved, according to the invention, by arranging the commutator between the fan and the winding core of the armature.

An arrangement such as this allows the power tool to be produced with a shorter shape, while also achieving better ergonomics. This is particularly advantageous when this embodiment is combined with the already-mentioned self-supporting embodiment of the stator and the two supporting parts which are held on it. If switches are intended to be accommodated in the area of the first grip part, for example in the case of an embodiment in the form of optical switches, a certain amount of space is required in any case for installation of the switch. This can at the same time be used for installation of the commutator in this area. To this extent, the commutator, brushes and one or more switches can be accommodated in the area of the first supporting part, thus making it possible to reduce the overall physical size.

Furthermore, no carbon dust from the brushes is blown through the motor. In addition, as a consequence of the space which is required in any case for the brushes, the first supporting part may be an air guide ring for advantageously guiding the air towards the fan, in which case a nozzle effect can be achieved at the same time.

As has already been mentioned above, an embodiment with switches or sensors in particular in the form of light-optical elements is particularly preferable. In this case, at least two optical waveguides are provided in each case, which have an associated transmitter and a receiver, as well as a monitoring element, for influencing the light signals which are transmitted between the optical waveguides.

Optical switches or sensors such as these can be accommodated in a particularly space-saving manner on virtually all of the parts of the power tool, thus making it possible to considerably improve the ergonomics overall.

For an embodiment such as this with optical waveguides, it is preferable to use a mount element for holding the optical waveguides, which has a molding in which depressions are provided, in which the optical waveguides can be inserted.

This has the advantage that the optical waveguides are better protected against vibration, environmental influences and the like, and that the assembly process is simplified, since the optical waveguides can be integrated in the mount element in advance so that only an already completed mount element now need be installed.

In this case, the molding preferably has holders for transmitting or receiving elements which are associated with the optical waveguides, or for switching elements for influencing radiation which is transmitted by the optical waveguides.

Furthermore, the molding may have a holder for LEDs.

This allows the optical waveguides to be attached together with the associated transmitting or receiving elements and together with the associated switching elements to the mount elements, thus allowing a simpler design and simpler assembly, overall.

Furthermore, it is preferable for the molding to interact with the housing of the power tool in order to seal the optical waveguides which are held in the molding, and/or transmitting or receiving elements or switching elements which are coupled to them, against contamination by dust or the like.

In this case, the molding together with the housing may form a completely sealed unit.

This results in better operational reliability, since the optical waveguides are screened from dust and the like by means of the mount element. This is particularly important for power tools in which it can be expected that a large amount of dust will be produced, for example in the case of grinders.

In one additional development of the invention, the molding is composed of a vibration-damping and/or acoustically damping material. It is also possible to mount damping elements on the molding by means, for example, of adhesive bonding. By way of example, these may be foam elements.

These measures also improve the operational reliability and, in addition, result in better ergonomics.

It is self-evident that the features of the invention which have been mentioned above and those which are still to be explained in the following text can be used not only in the respectively stated combination but also in other combinations or on their own without departing from the scope of the invention.

BRIEF DESCRIPTION OF THE DRAWINGS

Further features and advantages of the invention will become evident from the following description of preferred exemplary embodiments and with reference to the drawing, in which:

FIG. 1 shows a plan view of an power tool according to the invention, in the form of an angle grinder with a housing in the form of a rod;

FIG. 2 shows a simplified illustration of the power tool shown in FIG. 1, in which the protective shroud has been omitted, but showing the motor, which is held in the housing which is in the form of a rod, as well as the stator and two supporting parts which are attached to it;

FIG. 3 shows an enlarged side view of the power tool shown in FIG. 1, in which, however, all that can be seen is the tool head as well as the stator and a first and a second supporting part;

FIG. 4 shows a longitudinal section through the power tool shown in FIG. 3;

FIG. 9 shows a view of the power tool shown in FIG. 2 obliquely from above, but with a mount element inserted, as well as optical waveguides;

FIG. 10 shows a side view of the power tool shown in FIG. 9, and

DETAILED DESCRIPTION OF THE PREFERRED EMBODIMENTS

Figure 5:
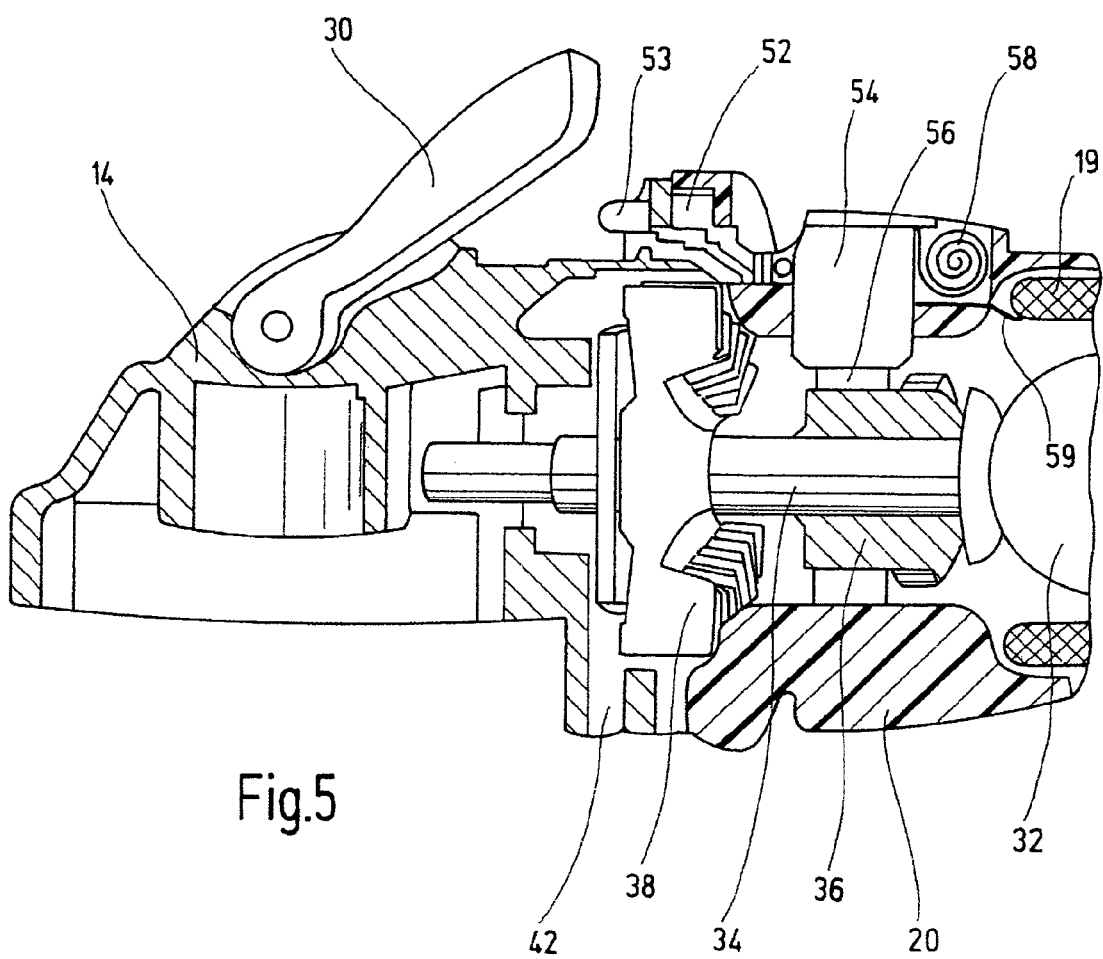
FIG. 5 shows a longitudinal section through the power tool shown in FIG. 4, but illustrated enlarged, on a section plane which has been rotated through 90° with respect to the section plane shown in FIG. 4.

FIG. 1 shows a plan view of the power tool according to the invention, which is annotated overall with the number 10.

The illustration shows an angle grinder with a housing which is in the form of a rod and is suitable for single-handed operation or for two-handed operation. A protective shroud 15 is provided on the tool head 14 of the power tool 10 in the conventional manner. In the area of the junction with the tool head 14, the housing 12 has a taper, on both sides of which switches are provided, which can be operated via elastic activation surfaces 27. In this area, the housing 12 has a grip surface 24 which can be gripped with one hand from above or below, and in which case two mutually opposite activation surfaces of the switches can be gripped.

In the rear area of the housing 12, which faces away from this and runs approximately conically towards the end, a second grip surface 26 is formed, which once again has an activation surface 28 on each side, for operation of a switch that is formed underneath it.

The switches are preferably optical switches, having optical waveguides between which the transmitted signals can be influenced via monitoring elements, with the optical waveguides having associated transmitting and receiving elements, as are in principle known from U.S. patent application Ser. No. 10/214,844 the entire disclosure of which is fully incorporated by reference.

FIG. 1 furthermore also shows the air induction slots 13 for the motor fan, which are located in the area facing away from the tool head 14, shortly in front of the activation surfaces 28 for the switches.

FIG. 2 shows the major components of the power tool 10 within the housing 12. According to the invention, the power tool 10 is equipped with a self-supporting electric motor 16 which has a self-supporting stator 18 to whose first end, which faces the tool head 14, a first supporting part 20 is attached, which is preferably composed of plastic. A second supporting part 22 composed of plastic is provided at the opposite, second end of the stator 18. Both supporting parts 20, 22 are screwed through the stator 18 in a manner which is still to be described below with reference to FIG. 4. Control electronics 23, which are indicated only schematically, are also held on the second supporting part 22. The tool head 14 is held on the first supporting part 20. The housing 12 which externally surrounds the power tool 10 is attached to both supporting parts 20, 22. Thus, overall, the motor 16 together with the supporting parts 20, 22 is the supporting structure to which all of the other components of the power tool 10 are attached.

This configuration allows a particularly space-saving and weight-saving design to be achieved, which likewise allows particularly advantageous assembly.

FIG. 3 shows the power tool 10 shown in FIG. 2 in an enlarged form, in an arrangement rotated approximately through 90° with respect to the position shown in FIG. 2, but with the housing having been removed and essentially illustrating the motor as well as the two supporting parts.

The shape of the two supporting parts 20, 22 can be seen well in FIG. 3. Holding surfaces 25 for holding optical switches, as will be explained in more detail in the following text, are provided on each side on the first supporting part 20.

A tool drive shaft, which is held in the tool head 14, as well as a tool that is attached to it are also indicated, schematically, by the dashed lines 17 in FIG. 3.

The stator 18 has a laminated stator core 31 through which the first and the second supporting part 20, 22 are screwed by means of screws 43 to form a compact unit, which is firmly connected to the laminated stator core 31.

Further details of the design of the power tool 10 can be seen in FIG. 4, which shows a longitudinal section through the power tool shown in FIG. 3. The motor 16 has an armature 32 which is mounted on a motor shaft 34. At the end of the motor shaft 34 facing away from the tool head 14, this motor shaft 34 is mounted by means of a bearing 40, which is held in a bearing shell in the second supporting part 22. At the opposite end, the motor shaft 34 is mounted on the tool head 14 by means of a bearing 39. A fan 38 can be seen in the transitional area between the first supporting part 20 and the tool head 14, and is mounted on the motor shaft 34. Fan outlet openings 42 in the tool head 14 are associated with the fan 38.

Air is thus induced through the electric motor 16 via induction openings 13 (FIG. 1) at the opposite end, while the cooling air emerges at the tool head 14, which is advantageous in order to minimize the ingress of foreign particles into the motor. This is because, of course, the greatest amount of dust is produced in the area of the tool head 14. The commutator 36 for the electric motor 16, which is in the form of a universal motor, is provided between the armature 32 and the fan 38. The associated brushes will be explained in more detail in the following text with reference to FIG. 5.

FIG. 4 also shows the screw connection of the two supporting parts 20, 22 through the laminated stator core 31. The tool head 14 is screwed to the first supporting part 20 in a manner which is not illustrated in any more detail.

FIG. 5 shows an enlarged section illustration through the power tool 10, in the form of a longitudinal section from the side in the area between the tool head 14 and the armature 32.

One brush holder 54, in which a (carbon) brush 56 is held, is in each case attached to the first supporting part 20, mutually opposite one another, on the upper face of the power tool 10, and on the lower face, offset through 180° with respect to it. A brush spring 58, as is illustrated schematically in FIG. 5, is in each case used to provide the contact pressure for the brushes 56. It is feasible to provide a contact-making capability for the brushes 56 directly in the first supporting part 20, which is produced from insulating plastic, by means of which an electrical connection 59 is made with the stator 18 and with the field windings 19. This may, of course, also be achieved in the conventional manner by means of connecting cables.

Figure 11:
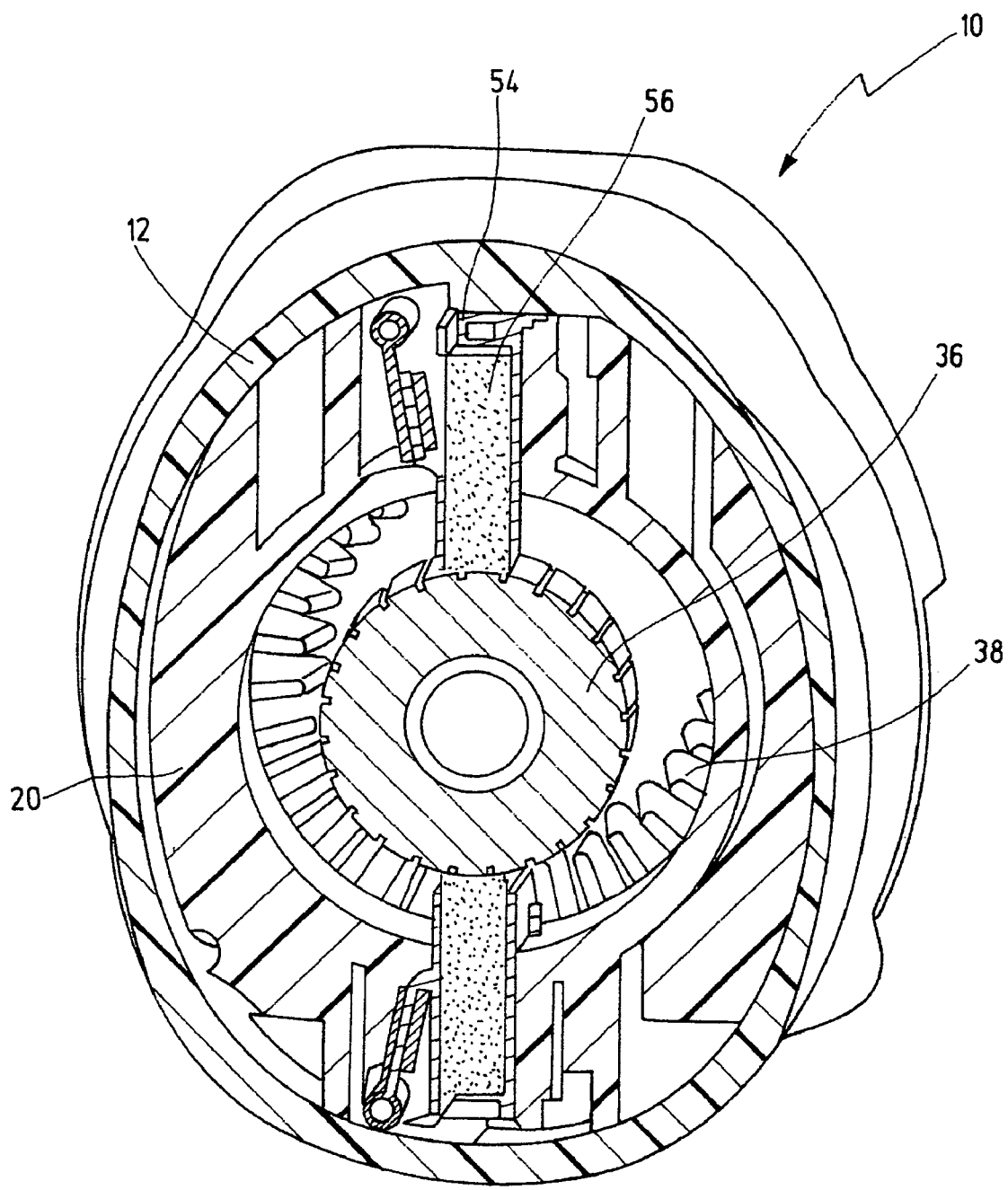
FIG. 11 shows a cross section through the power tool in area of the brushes.

The perspective, cross-section illustration shown in FIG. 11 shows that the housing 12 is oval in the area of the brushes 56. Since the diameter in a first direction is predetermined by the brushes 56, the oval shape results in a smaller diameter in the other direction, at right angles to the first. This results in better ergonomics for gripping the housing 12 at this point.

The first supporting part 20 is in the form of an air guide ring, whose inner surface ensures that the cooling air is guided in a specific manner through the motor 16 towards the fan 38, in which case a nozzle effect can be achieved at the same time.

FIG. 5 also shows a clamping lever 30 which is held on the tool head 14 and is used for clamping-in and releasing the tool 17. Since the power tool 10 is intended to be operated only with the clamping lever 30 closed, the clamping lever 30 has an associated sensor which continuously checks whether the clamping lever 30 is in its closed, clamped position. For this purpose, a light-optical switch 52 is provided at the upper end of the tool head 14 and can be operated via a switching element 53 that can be moved by the clamping lever 30. When the clamping lever 30 is closed, the switching element 53 is thus moved, which leads to a light beam being released which is transmitted via optical waveguides and is evaluated by associated evaluation logic.

Figure 6:
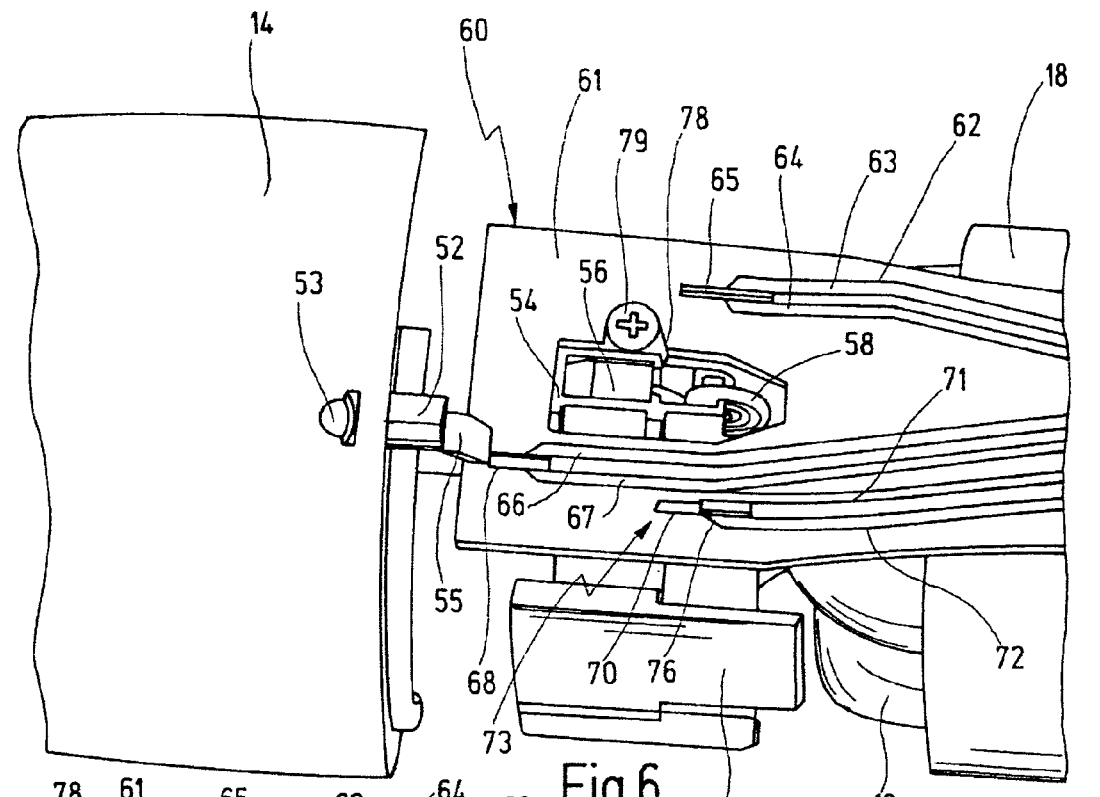
FIG. 6 shows an enlarged illustration of the power tool shown in FIG. 5, in the area between the tool head and the stator, with a mount element also being illustrated, with optical waveguides held in it, in order to form optical switches.

FIG. 6 shows, in more detail, the design of the optical switches which are used for the power tool 10. Each optical switch has two optical waveguides, one of which is in the form of a transmission conductor which is coupled to an LED, while the other optical waveguide is in the form of a receiving conductor and is connected to an associated evaluation unit. In the illustrated case, two associated optical waveguides each end at a specific distance in the form of prisms, so that light can emerge in between them. If no object is located between these two ends, then light passes from the transmitting conductor into the receiving conductor, and this is recorded by the evaluation logic.

FIG. 6 now illustrates a total of six optical waveguides 63, 64, 66, 67, 71, 72, which are each held in depressions 62 in a molding 61. The molding 61 is part of a mount element 61, whose shape can be seen in more detail in FIG. 7. The molding 61 is essentially a panel composed of a suitable plastic, which is curved in a suitable manner in the direction in which the optical waveguides 63 to 72 that are held in it extend. The plastic material of the molding 61 preferably has mechanical and, if required, acoustically damping characteristics, in order to provide better vibration damping. Since the optical waveguides 63-72 are inserted in associated depressions in the form of holding grooves 62, they are protected particularly well against environmental influences from the outside, thus ensuring reliable operation. Furthermore, a good signal-to-noise ratio is ensured, and the profile of the optical waveguides is fixed, by virtue of the separations which are predetermined by the depressions 62. Rigid optical waveguides can preferably be used for this purpose, and are curved three-dimensionally to the desired shape.

In the illustrated situation, two ends of mutually associated optical waveguides 63, 64; 66, 67 and 71, 72 are in each case associated with a respective elongated recess 65, 68 or 70, which extends outwards from the two ends in the area of the prisms. An associated switching element can engage in this recess 65, 68, 70, thus making it possible to interrupt the passage of light between the two ends.

In FIG. 6, the recess 68 between the two optical waveguides 66, 67 has an associated slide 55, which can be moved by means of the switching element 53 into the area between the two prismatic ends, in order in this way to interrupt the passage of light. A switching element 74 is provided in the area of the recess 70 for the switch 73, with which the two optical waveguides 71, 72 are associated, with this switching element 74 being held on the first supporting part 20 such that it can pivot and having a switching tongue 76 which can extend into the area of the recess 70 between the two prismatic ends of the optical waveguides 71, 72.

Furthermore, the mount element 60 has a suitable recess in order to allow installation of the brush holder 54 with the brush 56 and the brush spring 58. FIG. 6 shows an associated attachment screw 79.

Figure 7:
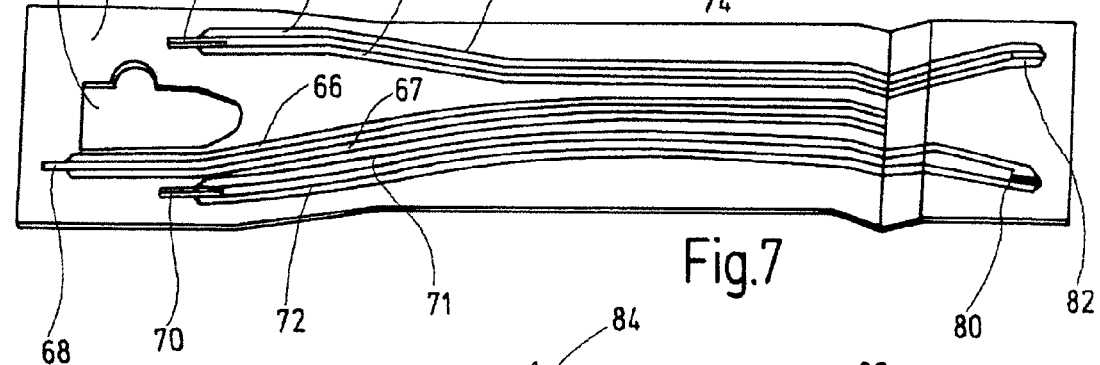
FIG. 7 shows an overall view of the mount element shown in FIG. 6.

FIG. 7 shows an overall view of the mount element 60 and of the optical waveguides 63-72.

Figure 8:
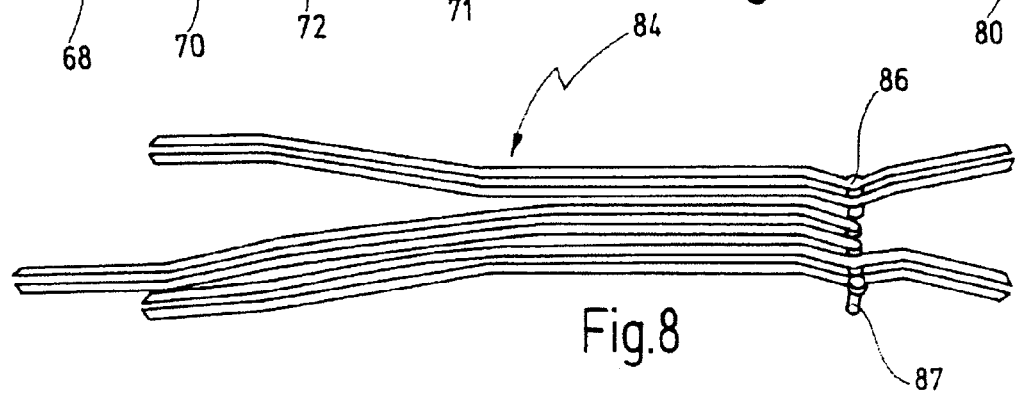
FIG. 8 shows a view of the optical waveguide bundle, which is inserted into the mount element shown in FIG. 7.

FIG. 8 shows how the relevant optical waveguides 63-72 can be combined to form a prefabricated optical waveguide bundle 84, with the optical waveguides 63-72 preferably being rigid and being held together by means of a common holder 86. This holder has depressions for the connection of LEDs for associated transmitter diodes, as well as connections for receiver elements. FIG. 8 indicates only one LED 87, by way of example.

FIGS. 9 and 10 show how the mount element 60 together with the optical waveguides which are held in it has been placed on the upper face of the two supporting parts 20, 22 and has been inserted directly on the tool head 14. With regard to the housing that is then fitted, this housing is preferably sealed to the edges of the mount element 60. The mount element 60 is thus located in a position in which it is immediately adjacent to the fitted housing, with the optical waveguides which are held in it being reliably protected against possible ingress of dirt or the like.

Furthermore, FIG. 10 also shows the slightly angled profile of the mount element 60 in the area of the holder 86, on which the transmitter LEDs and receiver elements are arranged. FIG. 10 also shows the switching elements 74 and 91 which are associated with the switches 73 and 90 and by means of which the transmission of light between interacting optical waveguides can be interrupted. Input radiation from the rear is, of course, also feasible.

What is claimed is:

1. A power tool comprising:
an electric motor for driving a tool, said electric motor comprising:

first and second supporting parts, each of said first and second supporting parts having first and second longitudinal ends;
a tool head attached to the first longitudinal end of said first supporting part;
a self-supporting stator having a first longitudinal end facing said tool head and a second longitudinal end opposite to the first longitudinal end, the first longitudinal end of said stator being attached to the second longitudinal end of said first supporting part and the second longitudinal end of said stator being attached to the first longitudinal end of said second supporting part
a motor shaft carrying an armature having a winding core;
a commutator;
brushes cooperating with said commutator;
a fan driven by said motor shaft; and
a housing which externally surrounds said stator and said first and second supporting parts, said housing being connected to at least one of said first and second supporting parts;
wherein said commutator is arranged between said fan and said winding core of said armature;
wherein said motor shaft is supported rotatably on said first supporting part, said second supporting part, and said tool head;
wherein said first supporting part is arranged for routing air between said fan and an opposite end of said electric motor along said armature and said brushes;
said power tool further comprising at least one switch engaging an activation surface made of an elastic material cooperating with a control element for activating said switch, said switch being supported on at least one of said first and second supporting parts;
wherein said first supporting part comprises at least one holding surface for holding said at least one switch; and
wherein said first supporting part is configured as an air guide ring forming an air flow channel extending around said commutator between said fan and said stator.

2. The power tool of claim 1, further comprising a switch supported by at least one of said first and second supporting parts, and an activation surface supported on said housing, said activation surface being arranged so as to allow activation of said switch.

3. The power tool of claim 1, wherein said housing is shaped ovally in a region wherein said brushes are supported.

4. The power tool of claim 2, further comprising a grip surface supported on one of said first and second supporting parts, said grip surface being arranged in a tapered region of said housing configured as a gripping area, said grip surface cooperating with at least one switch.

5. The power tool of claim 4, further comprising two brush holders supporting said brushes, said brush holders being arranged opposite to each other within said tapered region of said housing.

6. The power tool of claim 1, further comprising at least one optical switch, said optical switch comprising two optical waveguides, a transmitter connected to one of said waveguides, a receiver connected to another one of said waveguides, a control element for influencing optical signals transmitted between said optical waveguides, and a control circuitry for evaluating optical signals received by said receiver for effecting a switching operation.

7. A power tool comprising:
an electric motor for driving a tool, said electric motor comprising:
first and second supporting parts, each of said first and second supporting parts having first and second longitudinal ends;
a tool head attached to the first longitudinal end of said first supporting part;
a self-supporting stator having a first longitudinal end facing said tool head and a second longitudinal end opposite to the first longitudinal end, the first longitudinal end of said stator being attached to the second longitudinal end of said first supporting part and the second longitudinal end of said stator being attached to the first longitudinal end of said second supporting part
a motor shaft carrying an armature having a winding core;
a commutator;
brushes cooperating with said commutator;
a fan driven by said motor shaft; and
a housing which externally surrounds said stator and said first and second supporting parts, said housing being connected to at least one of said first and second supporting parts;
wherein said commutator is arranged between said fan and said winding core of said armature;
wherein said motor shaft is supported rotatably on said first supporting part, said second supporting part, and said tool head;
wherein a transitional area is formed within a region where said first supporting part is attached to said tool head;
said fan lying in the transitional area;
wherein said first supporting part is arranged for routing air between said fan and an opposite end of said electric motor along said armature and said brushes; and
wherein said first supporting part is configured as an air guide ring forming an air flow channel extending around said commutator between said fan and said stator.

8. The power tool of claim 7, wherein said stator and said first and second supporting parts form a self-supporting stator-unit, and wherein said brushes are attached by means of at least one brush holder to one of said first and second supporting parts.

9. The power tool of claim 7, further comprising at least one switch supported on one of said first and second supporting parts.

10. The power tool of claim 7, further comprising control electronics for controlling the electric motor, said control electronics being supported on one of said first and second supporting parts.

11. The power tool of claim 7, wherein said tool head is configured for receiving said tool.

12. The power tool of claim 11, wherein said motor shaft is mounted in bearings supported on said tool head and one of said first and second supporting parts.

13. The power tool of claim 9, further comprising at least one activation surface made of an elastic material cooperating with a control element for activating said switch, said switch being supported on at least one of said first and second supporting parts.

14. The power tool of claim 7, wherein said supporting parts are configured as molded parts made of an insulating plastic material.

15. The power tool of claim 7, further comprising at least one optical switch, said optical switch comprising two optical waveguides, a transmitter connected to one of said waveguides, a receiver connected to another one of said waveguides, a control element for influencing optical signals transmitted between said optical waveguides, and a control circuitry for evaluating optical signals received by said receiver for effecting a switching operation.

16. The power tool of claim 13, comprising at least three manually operated switches, at least two of which are arranged at opposite ends of said housing allowing to control said power tool by gripping a front end or a rear end thereof.

17. The power tool of claim 13, comprising at least three manually operated switches, at least two of which are arranged at opposite sides of said housing allowing to control said power tool by gripping a left side or a right side thereof.

18. An electric motor comprising:
first and second supporting parts, each of said first and second supporting parts having two opposing longitudinal ends;
a self-supporting stator having a first longitudinal end and a second longitudinal end opposite to the first longitudinal end, the first longitudinal end of said stator being attached to one of the longitudinal ends of said first supporting part and the second longitudinal end of said stator being attached to one of the longitudinal ends of said second supporting part;
a motor shaft carrying an armature having a winding core;
a commutator;
brushes cooperating with said commutator;
a fan driven by said motor shaft; and
a housing which externally surrounds said stator and said first and second supporting parts, said housing being connected to at least one of said first and second supporting parts;
wherein said commutator is arranged between said fan and said winding core of said armature;
wherein said motor shaft is supported rotatably on at least one of said first and second supporting parts;
wherein said first supporting part is arranged for routing air between said fan and an opposite end of said electric motor along said armature and said brushes;
wherein said first supporting part is configured as an air guide ring forming an air flow channel extending around said commutator between said fan and said stator.

19. An electric motor comprising:
first and second supporting parts, each of said first and second supporting parts having two opposing longitudinal ends;
a self-supporting stator having a first longitudinal end and a second longitudinal end opposite to the first longitudinal end, the first longitudinal end of said stator being attached to one of the longitudinal ends of said first supporting part and the second longitudinal end of said stator being attached to one of the longitudinal ends of said second supporting part;
a motor shaft carrying an armature having a winding core;
a commutator;
brushes cooperating with said commutator;
a fan driven by said motor shaft; and
a housing which externally surrounds said stator and said first and second supporting parts, said housing being connected to at least one of said first and second supporting parts;
wherein said commutator is arranged between said fan and said winding core of said armature;
wherein said motor shaft is supported rotatably on at least one of said first and second supporting parts;
wherein said first supporting part is arranged for routing air between said fan and an opposite end of said electric motor along said armature and said brushes;
wherein said first supporting part is arranged within said housing and is configured as an air guide ring forming an air flow channel extending around said commutator between said fan and said stator.

* * * * *